United States Patent [19]
Needham et al.

[11] 3,792,225
[45] Feb. 12, 1974

[54] WELDING POWER SOURCE

[75] Inventors: James C. Needham, Saffron; Peter Boughton, Balsham, both of England

[73] Assignee: The Welding Institute, Cambridge, England

[22] Filed: Aug. 24, 1972

[21] Appl. No.: 283,378

[30] Foreign Application Priority Data
Aug. 24, 1971  Great Britain .................. 39695/71

[52] U.S. Cl. ............................. 219/131 R, 219/135
[51] Int. Cl. ............................................. B23k 9/10
[58] Field of Search ... 219/13 R, 13 WR, 137, 69 S, 219/69 C, 135

[56] References Cited
UNITED STATES PATENTS

| | | | |
|---|---|---|---|
| 3,575,573 | 4/1971 | McCollister | 219/135 |
| 3,705,286 | 12/1972 | Kondo et al. | 219/69 C |
| 2,951,969 | 9/1960 | Matulaitis et al. | 219/69 C X |
| 3,688,180 | 8/1972 | Chiasson et al. | 219/131 WR X |
| 3,532,850 | 10/1970 | Schulz et al. | 219/69 C |
| 3,180,969 | 4/1965 | Williams | 219/137 |
| 3,051,828 | 8/1962 | Manz | 219/131 R |

Primary Examiner—C. L. Albritton
Assistant Examiner—Gale R. Peterson
Attorney, Agent, or Firm—Kemon, Palmer & Estabrook

[57] ABSTRACT

Metal arc welding apparatus, primarily intended for short-circuit welding, including a first D.C. power supply for maintaining an arc between a consumable electrode and a workpiece and a control circuit responsive to a short-circuit detector for coupling a second D.C. power supply, substantially without inductance, to the welding circuit after a delay. Preferably a further detector senses the impending rupture of the short-circuit and the control circuit acts to reduce the current before the rupture takes place.

15 Claims, 5 Drawing Figures

WELDING POWER SOURCE

In gas-shielded arc welding with a consumable electrode, a wire electrode is fed forward towards the workpiece and the electrode end is melted, the molten material being transferred to the workpiece. In most such processes this material is transferred across the electric arc between the electrode and the workpiece, either by gravity or more usually by magneto-dynamic forces and the effect of the gas streams. However, there is one form of gas-shielded arc welding, known as short circuit or dip transfer welding, in which each molten drop, during its transfer to the workpiece, forms a bridge or short circuit between the electrode and the workpiece. This technique permits lower currents to be employed than for normal free flight transfer welding and has been widely used for welding steel in a carbon dioxide atmosphere.

The present invention is primarily concerned with short circuit or dip transfer welding, although it can also be used in other forms of arc welding in which short circuits take place deliberately or accidentally.

Dip transfer welding is generally considered to be less successful for thicker workpieces than for thin workpieces, but the reason for this has not previously been adequately explained. A power supply of relatively low open circuit voltage is generally used in order to obtain "self adjustment," that is to say the delivery by the power supply of more or less current in response to a decreased or increased arc voltage in order to maintain a substantially constant arc length. This necessitates a power supply of relatively low internal impedance and such a power supply is capable of delivering an inordinately high short circuit current which would disrupt the metallic bridge, formed by the molten electrode end, so violently as to cause considerable spatter and disturbance of the weld pool. To overcome this difficulty, the dynamic characteristic of the power supply is modified by the addition of inductance. With this modification, the current is rising during the short circuit period but does not normally reach the full short circuit value and conversely falls during the arcing period towards a level determined by the arc voltage and power source setting. The peak value to which the short circuit current rises depends upon the duration of the short circuit, and this time period can vary from event to event by a factor of 5 in a typical system. This can cause the peak current to vary by as much as a factor of 2 depending on the particular values of the circuit components. Similarly, the arc current which in an inductive supply equals the peak short-circuit current at the beginning of the arc period will vary as the short circuit time varies and in addition will vary in its final value with variations in arcing time from event to event. Also this final value of arc current is the initial value of the short circuit current which in turn will play some part in determining the final value of short circuit current.

From this it is easy to appreciate why practical tests show that the current level at any particular part of the cycle varies widely from event to event.

To restrike the arc with a "constant potential" power source ideally requires a relatively large value of inductance, and also to prevent accidental extinction of the arc the circuit inductance should be large. However, a compromise has often to be made in selecting a smaller value of inductance to give an adequate rate of rise of current during the short circuit period.

Our investigations have shown that in the short-circuiting or dip transfer system (or in any other arc process in which short-circuiting may occur) the performance is greatly improved if the values of short-circuit current and arc current are controlled independently of one another. According to the present invention, we provide apparatus including a first D.C. power supply circuit connected to a welding circuit including the consumable electrode and the workpiece and adapted to supply a restricted current for maintaining an arc between the electrode and workpiece, a detector operative in response to signals derived from the welding circuit and resulting from the onset of a short-circuit condition, a second D.C. power supply circuit substantially without inductance, and a control circuit, including delay means, responsive to operations of the detector to connect the second power supply circuit to the welding circuit, after a period determined by the delay means, and thereby to apply an increased current to the welding circuit, the delay means being adjustable to permit variation in the period between the onset of the short-circuit condition and the increase in the current flow to the welding circuit. In the preferred form, our detector also includes means responsive to a change indicative of an impending rupture of the short circuit, and the control means responds by reducing or cutting off the additional current. The impending rupture may be detected by sensing an increase in voltage between the consumable electrode and the workpiece during the short-circuit condition as the metallic bridge between them begins to "neck," that is to say to reduce in cross-section, thereby increasing the resistance of the metallic bridge and the voltage across it.

This early termination of the short circuit is particularly advantageous in short circuit transfer welding carried out with a current above a "transition" level which will now be explained. It appears from the work which we have carried out that in such dip transfer welding with relatively fine electrode wires there is a metal transfer transition current which is unique for a particular electrode size and material. Below this current, short-circuit times are relatively long, the metal droplet being transferred on average in typically 0.002 secs (for 1.2 mm. diameter steel wire, for example). Above this current short-circuit times become relatively short, and are typically 0.0003 secs. It is thought that the transition current defines a change in the predominant mechanism of transfer, the region below the transition current being where surface tension forces predominate and the region above the transition current where magnetodynamic forces predominate.

It is desirable to operate above this transition current, because the proportion of the cycle devoted to arcing can then be increased for a given short-circuit repeat frequency. Also the short-circuit event itself is less random, giving a more consistent result. However, as short-circuit current increases, spatter produced by fusing the small metal bridge between the transferring droplet and the wire becomes more pronounced particularly for the larger diameter wires. By reducing the short-circuit current to a low value just prior to the natural termination of the short circuit we reduce this spatter to an acceptable level. The reduction may be achieved by switching the short-circuit current to a lower level for the remainder of the short-circuit condition.

It is also frequently beneficial to provide different current levels in the welding circuit during the arc condition. For example, with normal levels of arc current there is a tendency for the droplet to "bounce" away from the weld pool surface and this delays the onset of short circuiting. By reducing the arc current to a lower level after a predetermined period of arcing, the "wetting in" of the droplet is aided and a more consistent result is obtained.

Although a single power supply with suitable fast-acting control of the output current could be used, we prefer to use separate power supplies for the short circuit current and the arc current. Moreover, we prefer to have in the short-circuit supply a number of different current-conducting sections which can be switched on or off to add or subtract supply current in increments. Each section may include a transistor or a number of transistors connected in parallel. Although we prefer on-off control of the transistors, continuous control can be used, if desired, to give a controlled rise and fall of the current without the stored energy effects associated with the series circuit inductance used prior to the present invention. The power supply for the arcing period may be of similar design.

With two independently controlled levels of current we have found that under some conditions of operation the short circuit level can be used to control the frequency of short-circuiting without substantially affecting the mean duration of the short circuits. Thus, the proportion of time during which the arc is burning, and therefore the amount of fusion of the workpiece, can be separately controlled. Also in this system the arc current can be adjusted over a significant range in order to control fusion of the workpiece, without affecting the short-circuit behaviour. In this way, the system can be adjusted to give the required degree of fusion, together with good short-circuiting characteristics. This is a feature which cannot be obtained with existing systems in which there is an interaction between short-circuit and arc currents and a significant improvement in one state is obtained at the expense of the other.

Also, altering the level of the short-circuit current controls the amount of material transferred at each short circuit. Because the values of the short-circuit current and the arc current are controlled independently of one another, the amount of material transferred at each short circuit can be adjusted by altering the short-circuit current value without affecting the arc current value. In fact, the short-circuit current can be made dependent on the period elapsed since the preceding short circuit or on the average frequency of short circuits prior to the present short circuit.

In order that the invention may be better understood, one example of apparatus embodying the invention will now be described with reference to the accompanying drawings, in which.

In the short-circuit transfer process, during the arcing period the molten drop at the end of the consumable electrode begins to grow and as the wire-feed rate exceeds the instantaneous burn-off rate the arc gap closes. When the drop touches the weld pool at the workpiece the arc is extinguished and the reduced resistance between the electrode and the workpiece causes the voltage drop between them to fall and the current to rise. This continues until the molten bridge between the electrode and the workpiece is ruptured, when the arc is reestablished. In the waveforms shown in FIG. 1, the arc voltage and current are substantially constant at values V1 and $i1$ respectively during the arcing period, after the initial voltage peak at the end of the preceding short-circuit period. When the short circuit occurs, the voltage falls to a value V2 and the current may also be reduced to a value $i2$ to prevent the molten metal being blasted away by the high power dissipation at the local contact area. After a delay interval $t2$, the second power supply circuit is switched in to increase the current flowing through the molten bridge to a value $i3$ and this is maintained for the major part of the short-circuited period. The increase in current to the value $i3$ is accompanied by a small increase in voltage to a value V3. Near the end of the short circuit condition, the molten bridge begins to form a "neck" and this results in a small voltage increase V3' of very short duration. As will be explained in the specification, we detect this voltage increase and we use it to control the reduction of the current from a value $i3$ to a value $i4$ just prior to the termination of the short circuit. The reduction in current is accompanied by a corresponding reduction in voltage V4 until the end of the short circuit. Thereafter, the current and voltage resume their arcing values until the next short circuit occurs. If prior to the rupture, the current is reduced to a low level such as $i2$ the voltage also falls to a level which is substantially V2.

Figure 1:
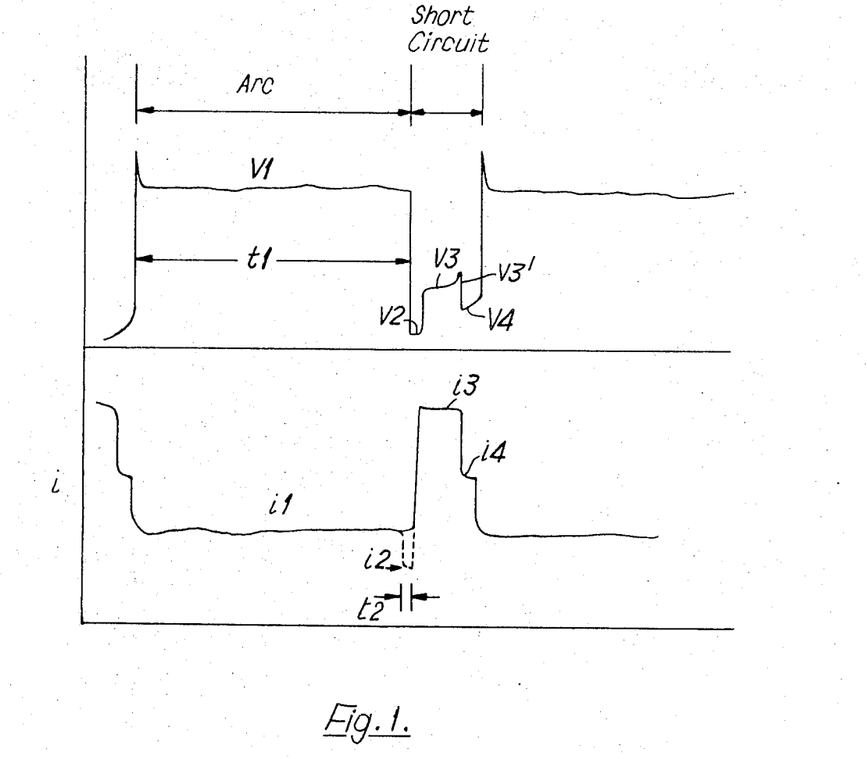
FIG. 1 is a waveform diagram of voltage and current during a typical cycle of a short circuit transfer welding process, carried out by apparatus embodying the present invention.

As indicated above, various modifications of these waveforms are possible; for example, for an initial portion of the arcing period, the arc current can exceed the current required to match the electrode feed rate and can then be reduced to a lower level for the remainder of the arcing period; the lower level may just balance the heat losses or may be more or less than this and can even be zero. This lower level encourages the onset of the short circuit. During the period of high level arcing current, the arcing current may consist of a series of impulses rather than one continuous level; for example, a short train of 500 ampere impulses, each of half millisecond duration, can be used in place of a continuous arc current of 30 amperes for a period of 4 milliseconds. The pulse current increases the agitation of the weld pool, which is beneficial both to the transfer of heat to the unfused zone of the workpiece and to the development of a short circuit during the final low-current (or even zero-current) portion of the arcing period.

In a similar way, the short circuit current may be stepped or may consist of a series of pulses.

Figure 2:
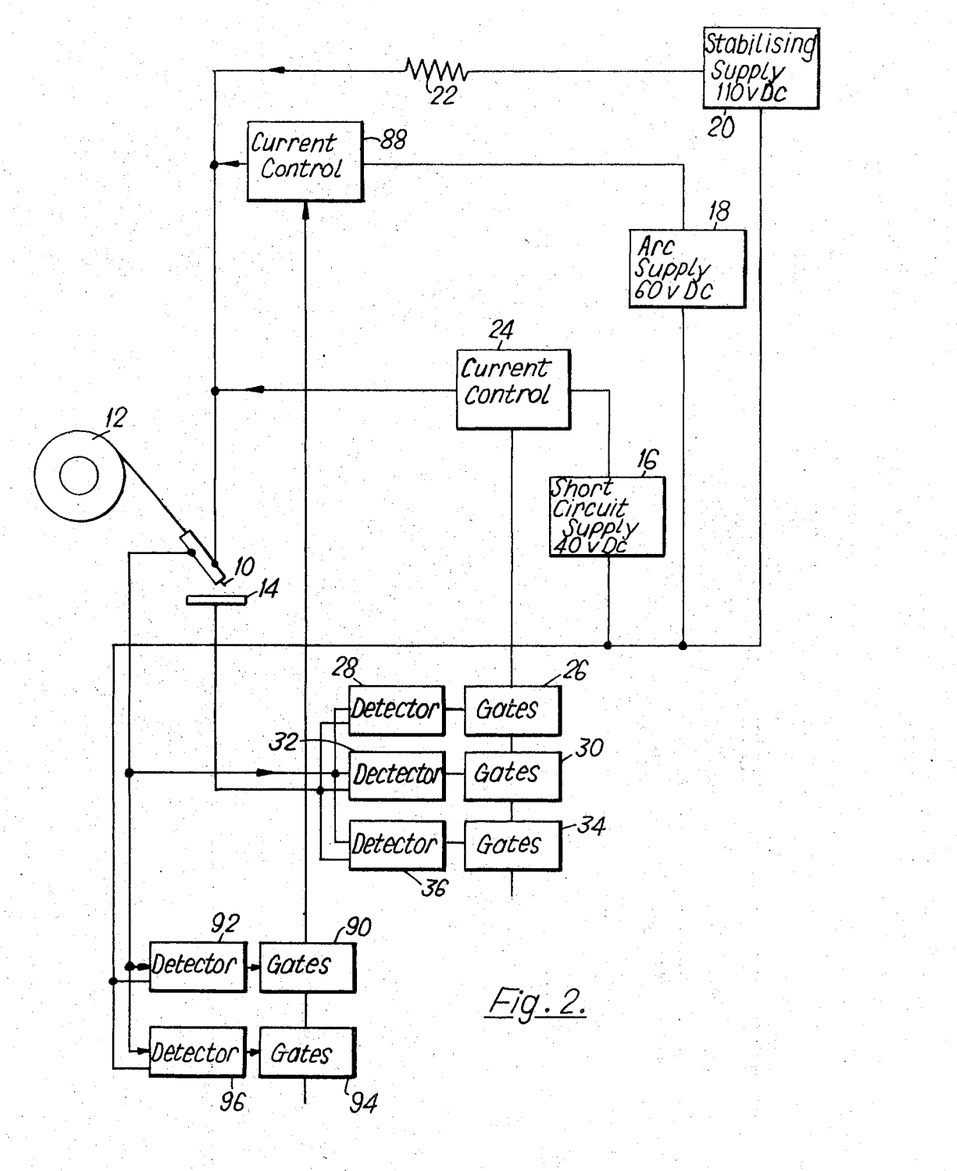
FIG. 2 is a block diagram of apparatus embodying the present invention.

In the apparatus shown in FIG. 2, a consumable electrode 10 is fed from a reel 12 towards a workpiece 14. The power supply system for the welding circuit includes a 40 volt D.C. supply 16 for supplying the short-circuit current, a 60 volt D.C. supply 18 for supplying the arc current, and a 110 volt D.C. supply 20 for supplying an arc stabilising current. The supply 20, in series with the resistor 22, is capable of providing only a low current (of the order of 10 amps) for a pilot arc or for arc stabilisation. The addition of such a supply to an arc system has previously been proposed and it forms no part of the present invention.

A current-controlling circuit 24 governs the amplitude of short-circuit current provided by the supply 16 to the welding circuit and the circuit 24 is in turn controlled, through gates 26, 30 and 34, by detectors 28, 32 and 36 which receive as their input signal the voltage between the consumable electrode 10 and the workpiece 14. In a similar manner the current supplied by the source 18 to the arc is governed by a current-controlling circuit 88 in turn controlled, through gates 90 and 94, by detectors 92 and 96 responsive to the voltage between the electrode 10 and the workpiece 14.

Figure 3:
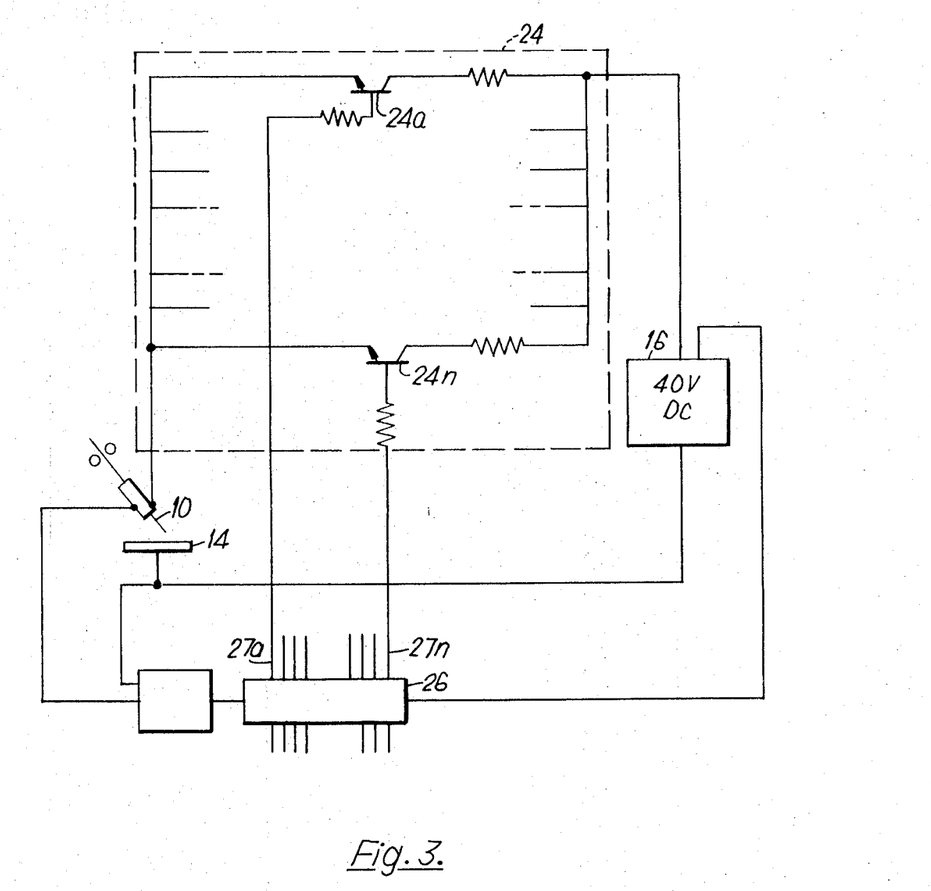
FIG. 3 is a circuit diagram of a current control unit used in the apparatus of FIG. 2.

The nature of the current-controlling circuit 24 is shown more clearly in FIG. 3. It will be seen that it includes a number of parallel-connected transistors 24a to 24n, the bases of which receive control signals from output conductors 27a to 27n of the gate unit 26. These transistors can be switched on individually by separate control lines as shown in the drawing or if desired there can be more transistors than control lines 27a to 27n, each control line governing conduction in a group of transistors. For convenience the supply for the gate unit 26 can be taken from the supply 16 to the parallel transistors 24a to 24n.

Figure 4:
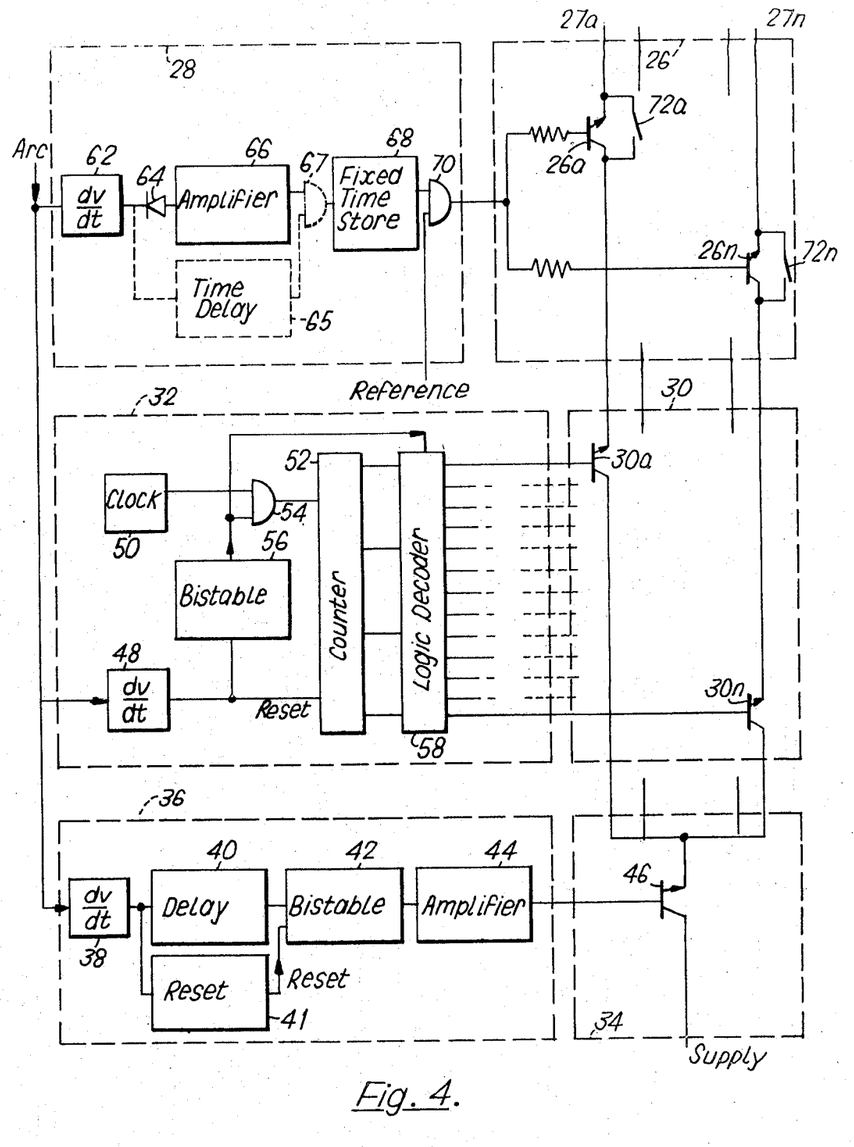
FIG. 4 is a block diagram of some detector and gating circuits used in the apparatus of FIG. 2.

The detector and gating circuits 26 to 36 are shown in greater detail in FIG. 4.

In FIG. 4, the detector 36 operates the gate 34 at a predetermined time after the commencement of the short circuit; the detector 32 operates a number of gates in the gate circuit 30 which is a function of the previous arc time; and the detector 28 operates the gate circuit 26 when an impending termination of the short circuit is detected, to close selected gates in the circuit 26.

A differentiating circuit 38 in the detector 36 detects the high rate of change of voltage at the commencement of a short circuit and applies a signal to a delay circuit 40. At the end of a predetermined period a signal from the delay circuit causes a bistable circuit 42 to change its output level and this acts through an amplifier 44 to turn on a transistor 46 in the gate 34. The emitter circuit of the transistor 46 feeds the collector circuits of a number of transistors 30a to 30n in gate unit 30, the bases of these transistors being connected to the detector circuit 32. The delay circuit 40 is adjustable to permit variation of the period between the onset of a short-circuit and the application of the additional current to the welding circuit.

The detector circuit 32 also receives the arc voltage in a differentiating circuit 48. The detector 32 includes a clock 50 which feeds a counter 52 through an AND gate 54. The other input of the AND gate is connected to a bistable circuit 56 and during the arcing period the output level of the latter is such as to permit clock pulses to pass through the AND gate to the counter 52. At the end of the arcing period the bistable circuit 56 changes state, the clock pulses are no longer fed to the counter, and the stored count is applied to the driver gate circuits 30a to 30n through a logic decoder 58. The output of the bistable circuit 56 is also fed to the logic decoder to allow the gates 30a to 30n to conduct only during the short circuit period. It will be seen that the number of conducting driver gates in the driver gate unit 30 depends upon the count achieved during the arcing period and thus the number of transistors 30a to 30n which are turned on (and therefore the amplitude of the short-circuit current) is a function of the time which has elapsed since the previous short circuit.

The emitters of transistors 30a to 30n are connected to the collectors of transistors 26a to 26n in the gate unit 26. When the selected ones of the transistors 30a to 30n are rendered conductive, the potential supplied to the bases of transistors 26a to 26n are such that these transistors also conduct and consequently signals are applied through selected ones of the lines 27a to 27n to the bases of the corresponding transistors 24a to 24n. This is the period of the high short-circuit current *i3* (see FIG. 1).

In the detector 28, the output of the differentiator 62 at the beginning of the short circuit is blocked by diode 64 and the reverse polarity pulse obtained, when the current pulse is applied to the short circuit, is passed through an amplifier 66 but is blocked by a monostable circuit 68 constituting a fixed time store. However, the pulse obtained when the bridge of molten metal, which constitutes the short-circuit between the electrode and the workpiece, begins to "neck" is applied through the amplifier 66 to the monostable circuit 68 and causes a change in the output of the monostable circuit. If required control lines from the gates 30a to 30n (acting in some cases through transistors 26a to 26n) can be used to control driver stages for the main short circuit power supply 24. If desired, to reduce the short-circuit current to some predetermined value either after a predetermined period or by the approaching termination of the short circuit, a time delay 65 may operate the circuit 68 through an OR gate 67. An AND gate 70 has one continuous reference input and turns off selected ones of the transistors 26a to 26n when the circuit 68 provides an output. This reduces the amplitude of the short-circuit current to a value predetermined by the number of selector switches 72a to 72n which have been preset in an open position.

The reset amplifier 41 receives a pulse at the end of a short-circuit from the differentiator 38 which causes the bistable circuit 42 to revert to its original state which acts through amplifier 44 to turn off transistor 46 and the gate 34.

The arcing current, i.e., the current which flows from arc supply 18 through the welding circuit, may be controlled by transistors in the current-controlling unit 88 in a manner similar to the control of the short-circuiting current by the transistors 24a to 24n, the base currents for the transistors in the unit 88 being provided in this case through gates 90 and 94 under the control of detectors 92 and 96. The detector 92 may operate the gate 90 in accordance with a predetermined function of the mean arc voltage. The detector 92 may include, for example, an integrating circuit receiving the arc voltage and rendering transistors within the gate unit 90 non-conductive when the output of the integrator exceeds a reference voltage, which may be preset individually for each transistor. This is an example of the method of encouraging a short-circuit to occur by reducing the current to a level less than that to match the electrode feed rate.

A detector 96 operates the gate unit 44 to switch the arc current on at the end of a short circuit and to switch it off again at the appropriate time. The detector 96 may for example consist only of a shaper and amplifier circuit providing a zero-level output for the short-circuit condition and a "1" level voltage for the arcing condition. This output is used to turn on a transistor in the gate unit 94 at the end of a short circuit and to turn the transistor off again at the beginning of a short circuit.

Alternatively, the detector 96 may include a differentiating circuit responsive to the changes in the voltage between the electrode and the workpiece at the end of a short circuit to render conducting a transistor in the gate unit 94. If desired, this transistor may be switched off again by a timer after a predetermined interval from its switching on.

If it is desired to reduce the current to a level i2 at the commencement of the short-circuit period, a circuit responsive to the onset of the short-circuit may reduce the current flow through the arc current-controlling circuit 88 for a period controlled by a delay circuit providing the same delay as the circuit 40.

Figure 5:
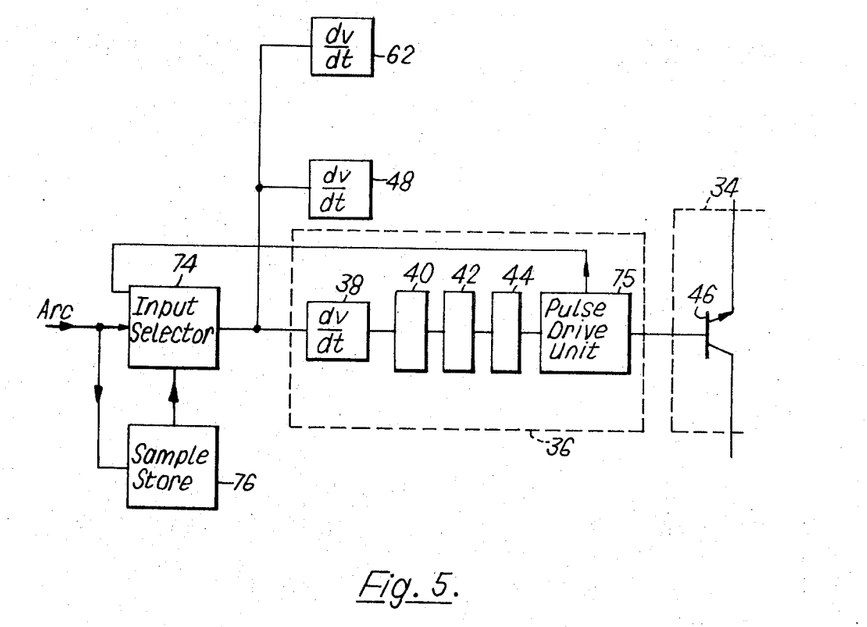
FIG. 5 is a block diagram of a modification to FIG. 4 which permits pulsing of the short-circuit current.

To pulse the short-circuit current, the circuit of FIG. 4 may be modified as shown in FIG. 5. The output of the amplifier 44 controls the transistor 46 through a pulse drive unit 46. To prevent the voltage pulses at the short circuit from affecting the differentiators 38, 48 and 62 an input selector 74 is inserted between the arc voltage line and the differentiating circuits. This input selector, which is controlled by the pulse drive unit 75, either selects the short circuit voltage and applies it directly to the differentiating circuits or supplies to the differentiating circuits a voltage from a sample store 76 which samples and stores the arc voltage between pulses. The apparatus then behaves in the manner described above.

The initation of the operation of the pulse drive unit 75 and the delay period to such initiation is controlled by the detector 36. Similarly at the end of the pulse period, as detected by the detector 36, the pulse drive unit 75 is switched off with the input selector 74 in the condition to receive the next short-circuit voltage signal.

If desired, the apparatus in co-pending U.S. Pat. application No. 281,738 may be used in a dip-transfer welding process embodying the present invention. In that application there is described apparatus in which as the welding electrode moves along the joint line the arc is cyclically oscillated across or along the joint line, the apparatus including means for effecting a periodic metal transfer from the electrode to the workpiece and means for correlating the phase of the cyclic oscillations with that of the periodic metal transfer. It is also proposed in that application that in a controlled dip-transfer process the transfer of metal may be effected by axially oscillating the electrode toward and away from the workpiece, the axial movement being correlated with the other cyclic oscillations. In this way, heat is applied to the workpiece and metal is transferred to the workpiece where it is most needed.

We claim:

1. Metal arc welding apparatus for use in a welding process in which short circuits occur or may occur between a consumable electrode and a workpiece in a welding circuit, the apparatus including:
    a first D.C. power supply circuit connected to the welding circuit to supply a restricted current to the welding circuit for maintaining an arc between said consumable electrode and said workpiece;
    a first short-circuit detector operative to produce a short circuit signal in response to signals derived from the welding circuit and resulting from the onset of a short-circuit condition;
    a second substantially inductance-free D.C. power supply circuit;
    and a control circuit, including delay means responsive to said short-circuit signal to connect said second power supply circuit to the welding circuit, after a period determined by said delay means, and thereby to apply an increased current to the welding circuit, said delay means being adjustable to permit variation in the period between the onset of the short circuit condition and the increase in current flow to the welding circuit.

2. Metal arc welding apparatus in accordance with claim 1, in which said short-circuit detector includes a differentiating circuit connected to receive the arc voltage during an arcing period.

3. Apparatus in accordance with claim 1, in which the first and second power supply circuits include independent power sources for supplying electric current to the welding circuit.

4. Apparatus in accordance with claim 3, in which the second power supply circuit includes a solid-state power control circuit.

5. Apparatus in accordance with claim 4, in which the solid-state power control circuit is adjustable to permit the supply to the welding circuit of successive currents of different amplitudes during a single short-circuit period.

6. Apparatus in accordance with claim 4, in which the solid-state power control circuit includes a number of different current-conducting sections and means for selecting different combinations of the said current-conducting sections to provide different levels of current for the welding circuit.

7. Apparatus in accordance with claim 6, in which each current-conducting section includes a transistor or a group of parallel-connected transistors.

8. Apparatus in accordance with claim 1, including further control means for reducing the arc current after a predetermined period has elapsed from the rupture of the short circuit, whereby the next short circuit is encouraged to occur at the reduced current level.

9. Apparatus in accordance with claim 8, in which the arcing current, prior to its reduction in level, consists of a series of impulses.

10. Apparatus in accordance with claim 1, in which the control means includes a pulsing circuit arranged to supply the additional current from the second power supply circuit as a train of pulses.

11. Apparatus in accordance with claim 1, including a third power source of high open circuit voltage but capable of supplying only a small current, connected to be operative during arcing periods to assist in stabilising the arc.

12. Metal arc welding apparatus for use in a welding process in which short circuits occur or may occur between a consumable electrode and a workpiece in a welding circuit, the apparatus including:

a first D.C. power supply circuit connected to the welding circuit to supply a restricted current to the welding circuit for maintaining an arc between said consumable electrode and said workpiece;

a first short circuit detector operative to produce a short circuit signal in response to signals derived from the welding circuit and resulting from the onset of each short circuit condition;

a second detector including means responsive to a predetermined change in each short circuit condition indicative of an impending rupture of the short circuit to produce a rupture-indicating signal;

a second substantially inductance-free D.C. power supply circuit; and a control circuit, including delay means, operative in each period of short-circuiting to connect said second power supply circuit to the welding circuit after a period determined by said delay means in response to said short-circuit signal from said first detector and thereby to apply and increased current to the welding circuit for an ensuing portion of the period of short circuiting, and to reduce or cut off the flow of current from the second power supply circuit to the welding circuit, prior to the termination of the said short-circuiting condition, in response to said rupture-indicating signal from said second detector.

13. Apparatus in accordance with claim 12, in which said second detector includes means for detecting an increase in voltage between the consumable electrode and the workpiece during a short-circuit condition, the said increase indicating the impending rupture of the short circuit.

14. Metal arc welding apparatus for use in a welding process in which short circuits occur or may occur between a consumable electrode and a workpiece in a welding circuit, the apparatus including:

a first D.C. power supply circuit connected to the welding circuit to supply a restricted current to the welding circuit for maintaining an arc between said consumable electrode and said workpiece;

a first short-circuit detector operative in response to signals derived from the welding circuit and resulting from the onset of a short-circuit condition;

a second detector including means responsive to a predetermined change in the short-circuit condition indicative of an impending rupture of the short circuit;

a second substantially inductance-free D.C. power supply circuit;

a first control circuit, including delay means, responsive to operation of said first detector to connect said second power supply circuit to the welding circuit, after a period determined by said delay means, and thereby to apply an increased current to the welding circuit, said delay means being adjustable to permit variation in the period between the onset of the short circuit condition and the increase in current flow to the welding circuit;

and a second control circuit responsive to a signal from the second detector to reduce or cut off the flow of current from the second power supply circuit to the welding circuit prior to the rupture of the short circuit.

15. Apparatus as defined in claim 14, in which the second power supply circuit includes a solid-state power control circuit.

* * * * *